(12) United States Patent
Nagata et al.

(10) Patent No.: US 9,370,899 B2
(45) Date of Patent: Jun. 21, 2016

(54) PLASTIC BAG MAKING APPARATUS

(71) Applicant: Totani Corporation, Kyoto (JP)

(72) Inventors: Hiroshi Nagata, Kyoto (JP); Yuji Ohnishi, Kyoto (JP)

(73) Assignee: Totani Corporation, Kyoto (JP)

( * ) Notice: Subject to any disclaimer, the term of this patent is extended or adjusted under 35 U.S.C. 154(b) by 0 days.

(21) Appl. No.: 14/721,027

(22) Filed: May 26, 2015

(65) Prior Publication Data

US 2015/0360415 A1  Dec. 17, 2015

(30) Foreign Application Priority Data

Jun. 11, 2014  (JP) ................. 2014-120473

(51) Int. Cl.
| | |
|---|---|
| *B29C 65/00* | (2006.01) |
| *B31B 1/00* | (2006.01) |
| *B29C 65/02* | (2006.01) |
| *B29C 65/18* | (2006.01) |
| *B29C 65/78* | (2006.01) |
| *B29L 9/00* | (2006.01) |
| *B29L 31/00* | (2006.01) |
| *B29L 5/00* | (2006.01) |
| *B29C 65/58* | (2006.01) |

(52) U.S. Cl.
CPC .............. *B29C 66/004* (2013.01); *B29C 65/02* (2013.01); *B29C 65/18* (2013.01); *B29C 65/7891* (2013.01); *B29C 66/0342* (2013.01); *B29C 66/1122* (2013.01); *B29C 66/474* (2013.01); *B29C 66/8161* (2013.01); *B29C 66/81431* (2013.01); *B29C 66/8221* (2013.01); *B29C 66/8322* (2013.01); *B29C 66/8511* (2013.01); *B31B 1/00* (2013.01); *B29C 65/58* (2013.01); *B29C 66/0044* (2013.01); *B29C 66/8122* (2013.01); *B29C 66/8181* (2013.01); *B29C 66/83413* (2013.01); *B29L 2005/00* (2013.01); *B29L 2009/001* (2013.01); *B29L 2031/7128* (2013.01); *B31B 2219/9019* (2013.01); *Y10T 156/16* (2015.01)

(58) Field of Classification Search
CPC .... B29C 65/02; B29C 65/18; B29C 65/7891; B29C 66/474; B29C 66/81431; B29C 66/8161; B29C 66/8511; B29C 66/8322
USPC .............................. 156/228, 580, 581, 583.1
See application file for complete search history.

(56) References Cited

U.S. PATENT DOCUMENTS

| | | |
|---|---|---|
| 3,839,128 A | 10/1974 | Arai |
| 5,529,659 A | 6/1996 | Ellsworth |

(Continued)

FOREIGN PATENT DOCUMENTS

| | | |
|---|---|---|
| GB | 1186733 | 4/1970 |
| JP | S4319033 | 8/1968 |

(Continued)

*Primary Examiner* — James Sells
(74) *Attorney, Agent, or Firm* — Kirschstein, Israel, Schiffmiller & Pieroni, P.C.

(57) ABSTRACT

In an apparatus for successively making plastic bags, a receiver plate 5 is fixed to a support plate 7. The support plate 7 extends widthwise of the webs of film material 2H and 2L to protrude on one of opposite sides of the webs of film material 2H and 2L. An elastic support device is disposed on the one side of the webs of film material 2H and 2L to elastically support the receiver plate 5 and the support plate 7. An attitude hold device is disposed on the one side of the webs of film material 2H and 2L to act on the support plate 7 so that the receiver plate 5 and the support plate 7 are held in attitude not to be inclined when being lowered and raised.

6 Claims, 4 Drawing Sheets

(56) References Cited

U.S. PATENT DOCUMENTS

| | | | |
|---|---|---|---|
| 2004/0060638 A1* | 4/2004 | Johnson | B29C 66/4312 156/66 |
| 2007/0284050 A1* | 12/2007 | Wihlborg | B29C 65/18 156/583.1 |
| 2011/0158561 A1* | 6/2011 | Kasai | B65D 33/2591 383/64 |
| 2012/0085479 A1* | 4/2012 | Goto | B65B 9/2028 156/66 |
| 2012/0314977 A1* | 12/2012 | Matsuo | B31B 1/00 383/97 |

FOREIGN PATENT DOCUMENTS

| | | |
|---|---|---|
| JP | H08118521 | 5/1996 |
| JP | H1031535 | 2/1998 |
| JP | 3618939 | 11/2004 |
| JP | 4526592 | 8/2010 |

* cited by examiner

PLASTIC BAG MAKING APPARATUS

TECHNICAL FIELD

The invention relates to an apparatus for successively making plastic bags.

BACKGROUND

Japanese Patent Publication No. 3,618,939 discloses an apparatus for successively making plastic bags each of which includes a panel portion and a zipper portion.

In the apparatus, upper and lower webs of film material are superposed with each other. The apparatus includes upper and lower heat seal bars between which the upper and lower webs of film material are directed. Upper and lower bodies of zipper material are directed between the upper and lower webs of film material. The webs of film material and the bodies of zipper material are fed longitudinally thereof and intermittently. A receiver plate is interposed between the upper and lower bodies of zipper material. The upper heat seal bar is lowered toward the lower heat seal bar whenever the webs of film material and the bodies of zipper material are fed intermittently so that the webs of film material and the bodies of zipper material are sandwiched between the heat seal bars and the receiver plate. Accordingly, the upper web of film material and the upper body of zipper material are heat sealed with each other while the lower web of film material and the lower body of zipper material are heat sealed with each other, to successively make the plastic bags of the webs of film material and the bodies of zipper material. The webs of film material comprise webs of panel material which are plastics. The bodies of zipper material are also plastics. The panel portion is formed of the webs of film material. The zipper portion is formed of the bodies of zipper material. The bodies of zipper material may be called bodies of chuck material. The zipper portion may be called a chuck portion.

In addition, the apparatus includes a support plate extending widthwise of the webs of film material to protrude on opposite sides of the webs of film material, the receiver plate being fixed to the support plate. The apparatus further includes drives comprising air cylinders which are disposed on the opposite sides of the webs of film material and connected to the support plate so that the receiver plate and the support plate are carried by the air cylinders. It should therefore be understood that the apparatus constructs a double-support structure for the support plate. The receiver plate and the support plate are then raised by the air cylinders so that the receiver plate is moved away from the lower heat seal bar after the webs of film material and the bodies of zipper material are heat sealed with each other and when the upper heat seal bar is raised and returned to an original position. The webs of film material and the bodies of zipper material are therefore lifted by the receiver plate which is raised so that the lower web of film material is torn off the lower heat seal bar. The webs of film material and the bodies of zipper material are then fed again and intermittently. The webs of film material are therefore fed intermittently in a torn off state, without advancing obliquely or tortuously.

However, in the apparatus, the support plate has to protrude on the opposite sides of the webs of film material. In addition, the support plate has to be carried and raised by the drives disposed on the opposite sides of the webs of film material. The apparatus is therefore complicated in structure and high in cost.

Furthermore, the upper and lower bodies of zipper material are directed between the upper and lower webs of film material which do not always comprise the webs of panel material. For example, Japanese Patent Publication No. 4,526,592 discloses an apparatus for successively making plastic bags in which one of the upper and lower webs of film material comprises a web of panel material while the other web of film material comprises a web of bottom gusset material. The upper and lower bodies of zipper material are directed between the web of panel material and the web of bottom gusset material so that a bottom gusset portion and a bottom protrusion are formed of the web of bottom gusset material, the zipper portion being formed in the bottom protrusion.

In this case, the receiver plate may be interposed between the upper and lower bodies of zipper material and fixed to the support plate, as in the case of the apparatus of Japanese Patent Publication No. 3,618,939. However, the support plate cannot protrude on the opposite sides of the web of panel material to construct the double-support structure for the support plate. The support plate can merely protrude on one of the opposite sides of the web of panel material to construct a cantilever structure. It is therefore difficult to make the receiver plate and the support plate raised by the drive. Accordingly, the lower web of film material is not torn off the lower heat seal bar after being heat sealed. The webs of film material are then fed intermittently as they are, to advance obliquely or tortuously.

Each of Japanese Laid-Open Patent Publication No. H08-118,521, Japanese Laid-Open Patent Publication No. H10-31,535 and Japanese Utility Model Publication No. S43-19,033 discloses an apparatus for successively making plastic bags, which constructs the cantilever structure for the support plate. In addition, the upper and lower heat seal bars are lowered and raised respectively so that the webs of film material and the bodies of zipper material are sandwiched between the heat seal bars and the receiver plate. Accordingly, the upper web of film material and the upper body of zipper material are heat sealed with each other while the lower web of film material and the lower body of zipper material are heat sealed with each other. The upper and lower heat seal bars are then raised and lowered respectively so that the upper and lower webs of film material are torn off the upper and lower heat seal bars.

However, in order to make the upper and lower heat seal bars lowered and raised respectively, drives are required respectively. The apparatus is therefore complicated in structure and high in cost.

It is therefore an object of the invention to provide an apparatus for successively making plastic bags each of which includes a panel portion and a zipper portion, to be simple in structure and low in cost.

SUMMARY OF THE INVENTION

According to the invention, the apparatus includes upper and lower heat seal bars between which upper and lower webs of film material are directed. Upper and lower bodies of zipper material are directed between the upper and lower webs of film material. The webs of film material and the bodies of zipper material are fed longitudinally thereof and intermittently. A receiver plate is interposed between the upper and lower bodies of zipper material. The upper heat seal bar is lowered toward the lower heat seal bar whenever the webs of film material and the bodies of zipper material are fed intermittently so that the webs of film material and the bodies of zipper material are sandwiched between the heat seal bars and the receiver plate. Accordingly, the upper web of film material and the upper body of zipper material are heat sealed with each other while the lower web of film material and the lower body of zipper material are heat sealed with each other, to successively make the plastic bags of the webs of film material and the bodies of zipper material.

The apparatus comprises a support plate extending widthwise of the webs of film material to protrude on one of opposite sides of the webs of film material, the receiver plate being fixed to the support plate. The apparatus further comprises an elastic support device disposed on the one side of the webs of film material and interposed between the support plate and a frame to elastically support the receiver plate and the support plate so that the receiver plate and the support plate are pushed down and lowered by the upper heat seal bar to make the webs of film material and the bodies of zipper material sandwiched between the heat seal bars and the receiver plate and heat sealed with each other. The receiver plate and the support plate are then raised by the elastic support device so that the receiver plate is moved away from the lower heat seal bar after the webs of film material and the bodies of zipper material are heat sealed with each other. The apparatus further comprises an attitude hold device disposed on the one side of the webs of film material and interposed between the support plate and the frame to act on the support plate so that the receiver plate and the support plate are held in attitude not to be inclined when being lowered and raised.

In a preferred embodiment, the attitude hold device comprises upper and lower leaf springs or links having the same length and extending widthwise of the webs of film material to be spaced from and disposed parallel to each other. The support plate and the frame are connected by means of the upper and lower leaf springs or links.

The elastic support device comprises an extension spring by which the receiver plate and the support plate are hung for elastic support.

The elastic support device may comprise a compression spring or air cylinder.

The receiver plate extends longitudinally of the webs of film material to have opposite ends. The receiver plate is fixed to the support plate at a position of at least one of the opposite ends of the receiver plate.

The receiver plate may extend longitudinally of the webs of film material to have opposite ends each of which is provided with the support plate, the elastic support device and the attitude hold device. The receiver plate and the support plate are carried at each of positions of the opposite ends of the receiver plate.

BEST MODE TO CARRY OUT THE INVENTION

Figure 1:
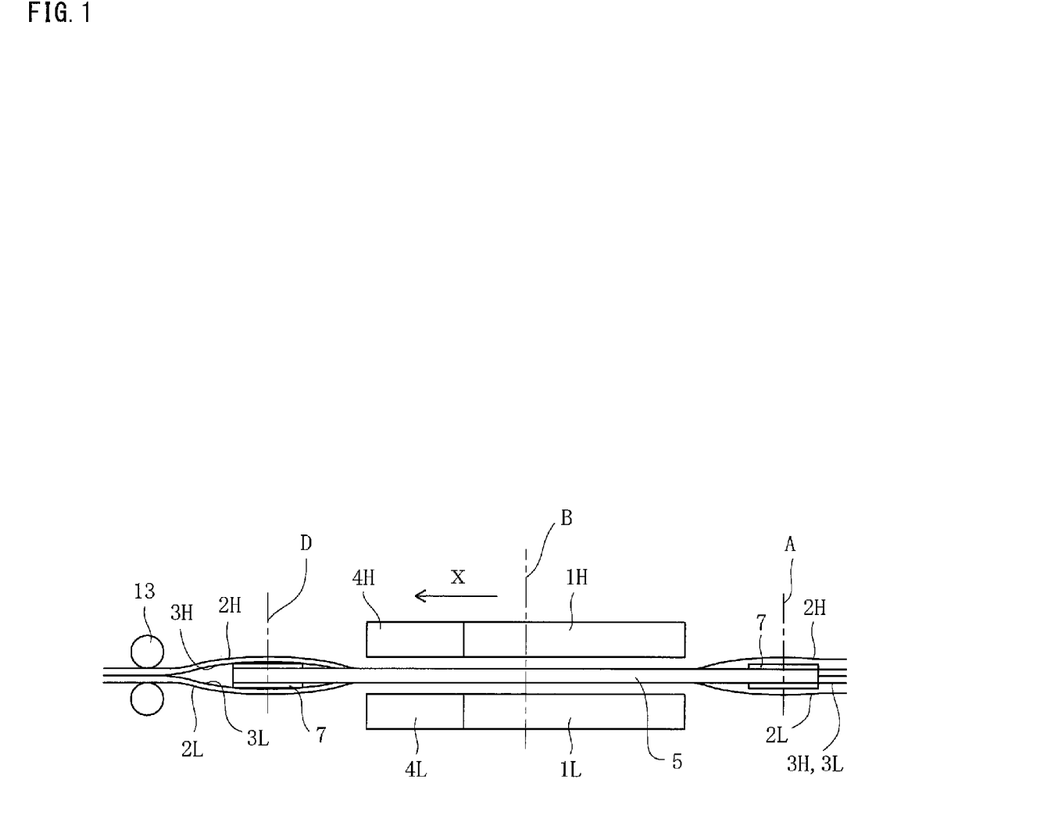
FIG. 1 is a side view of a preferred embodiment of the invention.

Turning now to the drawings, FIG. 1 illustrates an apparatus for successively making plastic bags, according to the invention. The apparatus includes upper and lower heat seal bars 1H and 1L opposed to each other. Upper and lower webs of film material 2H and 2L are superposed with each other and directed between the upper and lower heat seal bars 1H and 1L. For example, the webs of film material 2H and 2L comprise webs of panel material which are plastics. Upper and lower bodies of zipper material 3H and 3L are engaged with each other and directed between the upper and lower webs of film material 2H and 2L. The webs of film material 2H and 2L and the bodies of zipper material 3H and 3L are fed longitudinally thereof and intermittently. They are therefore fed in a direction X longitudinal thereof. The bodies of zipper material 3H and 3L are also plastics. In addition, a drive is connected to the upper heat seal bar 1H so that the upper heat seal bar 1H is lowered and raised by the drive. For example, the drive comprises a linkage. The bodies of zipper material 3H and 3L are engaged with each other, as described above, to have an engaged portion, as in the case of the apparatus of Japanese Patent Publication No. 3,618,939.

In the embodiment, upper and lower cooling bars 4H and 4L are opposed to each other and disposed downstream of the heat seal bars 1H and 1L. The webs of film material 2H and 2L and the bodies of zipper material 3H and 3L are directed between the upper and lower cooling bars 4H and 4L and fed longitudinally thereof and intermittently. The drive is connected to the upper cooling bar 4H so that the upper cooling bar 4H is lowered and raised integrally with the upper heat seal bar 1H, as also in the case of the apparatus of the patent publication.

Figure 2:
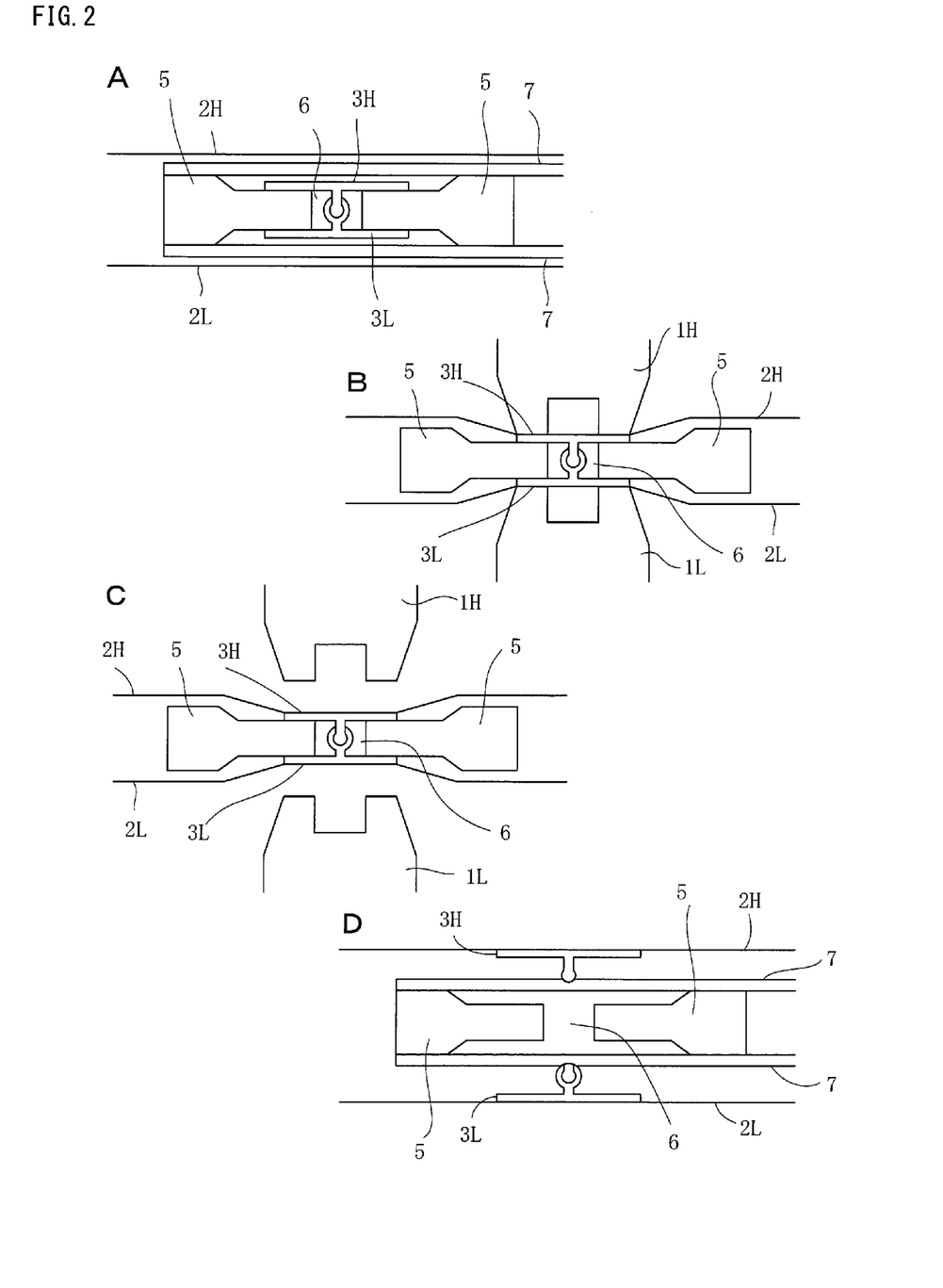
FIG. 2 is a cross sectional view (A) of the apparatus of FIG. 1 viewing at the position A, a cross sectional view (B) of the apparatus of FIG. 1 viewing at the position B, a cross sectional view (C) of the upper heat seal bar of (B) when being raised and a cross sectional view (D) of the apparatus of FIG. 1 viewing at the position D.

The apparatus further includes a receiver plate 5, as shown in FIG. 2. The receiver plate 5 extends longitudinally of the webs of film material 2H and 2L to be interposed between the upper and lower bodies of zipper material 3H and 3L. The receiver plate 5 comprises two plates opposed to and spaced from each other widthwise of the webs of film material 2H and 2L so that a guide groove 6 is formed between the plates 5. The upper and lower bodies of zipper material 3H and 3L are directed above and below the receiver plate 5 at the position of the guide groove 6, to have the engaged portion received in the guide groove 6. The receiver plate 5 is a type of water cooling, having a water cooling jacket, as also in the case of the apparatus of the patent publication.

Figure 3:
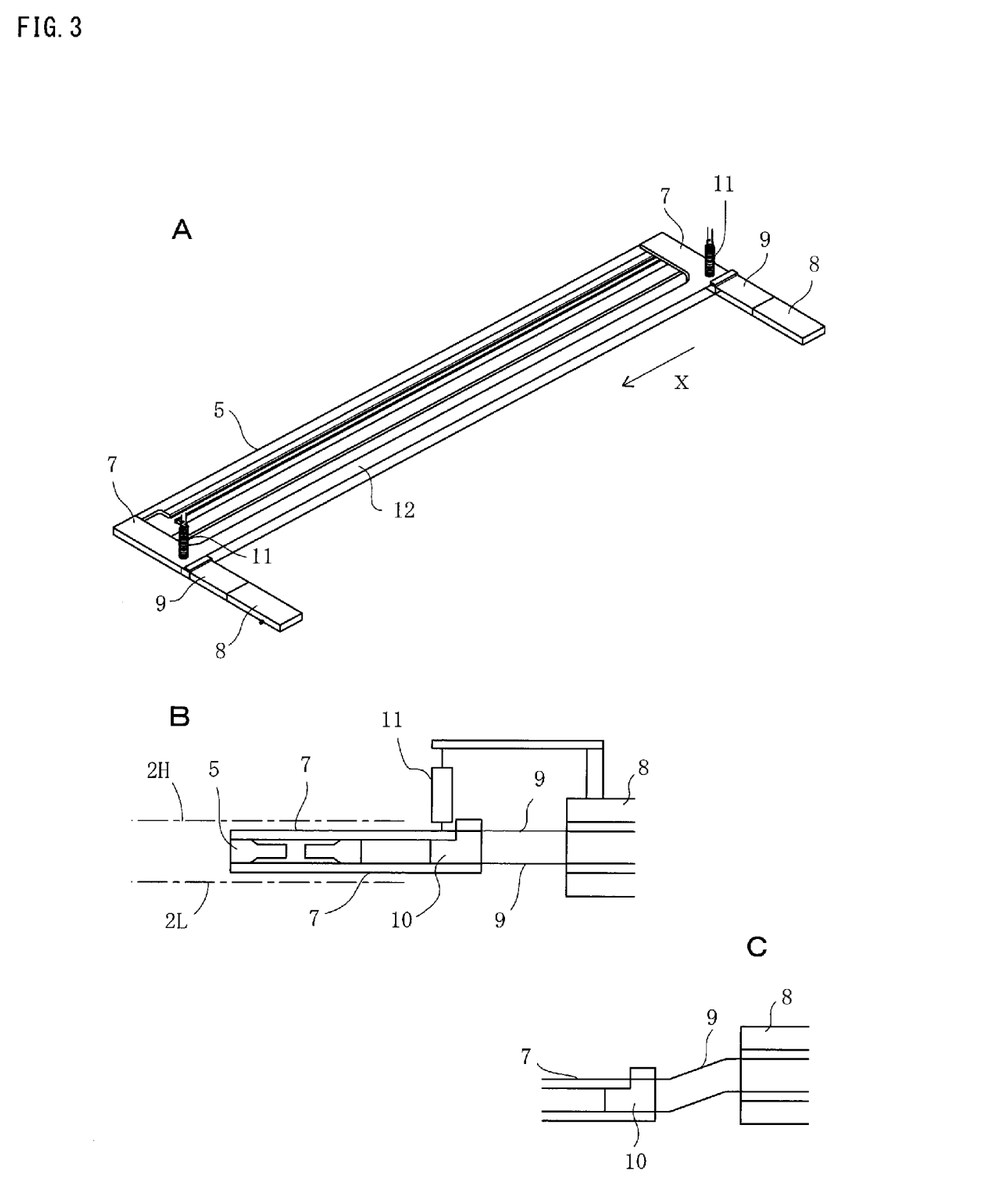
FIG. 3 is a perspective view (A) of the apparatus of FIG. 1, a cross sectional view (B) of the receiver plate, the support plate, the leaf springs and the extension spring of (A) and an explanatory view (C) of the leaf springs of B when acting on the support plate.

The apparatus further includes a support plate 7 extending widthwise of the webs of film material 2H and 2L to protrude on one of opposite sides of the webs of film material 2H and 2L, the receiver plate 5 being fixed to the support plate 7, as shown in FIG. 3. In the embodiment, the support plate 7 comprises upper and lower plates, the receiver plate 5 being inserted between and fixed to the upper and lower plates 7. The apparatus further includes an elastic support device disposed on the one side of the webs of film material 2H and 2L and interposed between the support plate 7 and a frame 8 to elastically support the receiver plate 5 and the support plate 7 so that the receiver plate 5 and support plate 7 are pushed down and lowered by the upper heat seal bar 1H to make the webs of film material 2H and 2L and the bodies of zipper material 3H and 3L sandwiched between the heat seal bars 1H and 1L and the receiver plate 5 and heat sealed with each other. The receiver plate 5 and the support plate 7 are then raised by the elastic support device so that the receiver plate 5 is moved away from the lower heat seal bar 1L after the webs of film material 2H and 2L and the bodies of zipper material 3H and 3L are heat sealed with each other. The apparatus further includes an attitude hold device or posture holding device disposed on the one side of the webs of film material 2H and 2L and interposed between the support plate 7 and the frame 8 to act on the support plate 7 so that the receiver plate 5 and the support plate 7 are held in attitude or posture not to be inclined when being lowered and raised.

In the embodiment, the attitude hold device comprises upper and lower leaf springs 9 disposed between the support plate 7 and the frame 8. The upper and lower leaf springs 9 have the same length and extend widthwise of the web of film material 2H and 2L to be spaced from and disposed parallel to each other. The support plate 7 and the frame 8 are connected by means of the upper and lower leaf springs 9. The support plate 7 comprises the upper and lower plates, as described previously. In addition, in the embodiment, a spacer 10 is inserted between the upper and lower plates 7 which are fixed to the spacer 10 so that the support plate 7 and the frame 8 are connected by means of the spacer 10 and the leaf springs 9.

On the other hand, the elastic support device comprises an extension spring 11 extending vertically, disposed above the support plate 7, mounted on the frame 8 and connected to the support plate 7. The receiver plate 5 and the support plate 7 are hung by the extension spring 11 for elastic support.

The receiver plate 5 extends longitudinally of the webs of film material 2H and 2L, as described previously, to have opposite ends. The receiver plate 5 is fixed to the support plate 7 at a position of at least one of the opposite ends of the receiver plate 5.

In the embodiment, the receiver plate 5 extends longitudinally of the webs of film material 2H and 2L to have opposite ends each of which is provided with the support plate 7, the spacer 10, the elastic support device and the attitude hold device. The receiver plate 5 and the support plate 7 are carried at each of positions of the opposite ends of the receiver plate 5. In addition, the support plates 7 are connected by means of a connecting plate 12 disposed on the one side of the webs of film material 2H and 2L. The connecting plate 12 is formed integrally with the support plates 7 to extend longitudinally of the webs of film material 2H and 2L.

The apparatus further includes upper and lower press rollers 13 disposed downstream of the receiver plate 5. The webs of film material 2H and 2L and the bodies of zipper material 3H and 3L are directed between the upper and lower press rollers 13.

In the apparatus, the upper and lower webs of film material 2H and 2L are positioned above and below the support plate 7 to be directed between the upper and lower heat seal bars 1H and 1L when the webs of film material 2H and 2L and the bodies of zipper material 3H and 3L are fed longitudinally thereof to reach the upstream end of the receiver plate 5. The upper and lower bodies of zipper material 3H and 3L pass between the upper and lower plates 7 to have the engaged portion directed and received in the guide groove 6 of the receiver plate 5 (FIG. 2 A), as in the case of the apparatus of the patent publication.

The upper heat seal bar 1H is then moved down by the drive to be lowered toward the lower heat seal bar 1L whenever the webs of film material 2H and 2L and the bodies of zipper material 3H and 3L are fed intermittently and stopped temporarily so that the webs of film material 2H and 2L and the bodies of zipper material 3H and 3L are sandwiched between the heat seal bars 1H and 1L and the receiver plate 5 and heated by the heat seal bars 1H and 1L. Accordingly, the upper web of film material 2H and the upper body of zipper material 3H are heat sealed with each other while the lower web of film material 2L and the lower body of zipper material 3L are heat sealed with each other. The upper heat seal bar 1H is then moved up by the drive to be raised and returned to an original position.

In addition, in the apparatus, the receiver plate 5 and the support plate 7 are pushed down and lowered by the upper heat seal bar 1H to make the webs of film material 2H and 2L and the bodies of zipper material 3H and 3L sandwiched between the heat seal bars 1H and 1L and the receiver plate 5 and heat sealed with each other (FIG. 2B). The extension spring 11 and the leaf springs 9 permit the receiver plate 5 and the support plate 7 to be lowered. The extension spring 11 is pulled longitudinally thereof and deformed elastically while the upper and lower leaf springs 9 are bent in the same direction. In this connection, in view of the upper and lower leaf springs 9 having the same length and disposed parallel to each other, it is clear that the upper and lower leaf springs 9 act on the support plate 7 so that the receiver plate 5 and the support plate 7 are held in attitude not to be inclined when being lowered (FIGS. 3B, C).

Furthermore, the receiver plate 5 has the opposite ends each of which is provided with the support plate 7, the elastic support device and the attitude hold device, as described previously, to elastically support the receiver plate 5 and the support plate 7 at the opposite ends of the receiver plate 5. The attitude hold devices act on the support plates 7 at the opposite ends of the receiver plate 5. The receiver plate 5 and the support plates 7 are therefore held in attitude not to be inclined widthwise and longitudinally of the webs of film material 2H and 2L, when being lowered. The receiver plate 5 and the support plates 7 are then raised by the extension springs 11 so that the receiver plate 5 is moved away from the lower heat seal bar 1L after the webs of film material 2H and 2L and the bodies of zipper material 3H and 3L are heat sealed with each other and when the upper heat seal bar 1H is raised and returned to the original position (FIG. 2C). The upper and lower leaf springs 9 act on the support plate 7 so that the receiver plate 5 and the support plate 7 are held in attitude not to be inclined when being raised. The webs of film material 2H and 2L and the bodies of zipper material 3H and 3L are then fed again and intermittently.

A Teflon (trademark) sheet may be interposed between the heat seal bars 1H and 1L and the webs of film material 2H and 2L when being heat sealed.

The upper cooling bar 4H is lowered toward the lower cooling bar 4L at the same time as the upper heat seal bar 1H being lowered toward the lower heat seal bar 1L. The webs of film material 2H and 2L and the bodies of zipper material 3H and 3L are therefore sandwiched between and cooled by the cooling bar 4H and 4L and the receiver plate 5 after being heat sealed.

The upper and lower bodies of zipper material 3H and 3L are then disengaged once when the webs of film material 2H and 2L and the bodies of zipper material 3H and 3L are fed intermittently to reach the downstream end of the receiver plate 5. The upper web of film material 2H and the upper body of zipper material 3H are directed above the support plate 7 while the lower web of film material 2L and the lower body of zipper material 3L are directed below the support plate 7 (FIG. 2D). The webs of film material 2H and 2L and the bodies of zipper material 3H and 3L are then directed and sandwiched between the press rollers 13 so that the upper and lower bodies of zipper material 3H and 3L are engaged with each other again.

Subsequently, the webs of film material 2H and 2L are heat sealed with each other by other seal bars, the webs of film material 2H and 2L and the bodies of zipper material 3H and 3L being then crosscut by a crosscutter, to successively make plastic bags of the webs of film material 2H and 2L and the bodies of zipper material 3H and 3L, as in the case of the apparatus of Japanese Patent Publication No. 3,618,939. The panel portion is formed of the webs of film material 2H and 2L. The zipper portion is formed of the bodies of zipper material 3H and 3L.

It should be understood that in the apparatus, the upper and lower leaf springs 9 act on the support plate 7 so that the receiver plate 5 and the support plate 7 are held in attitude not to be inclined when being pushed down and lowered by the upper heat seal bar 1H to make the webs of film material 2H and 2L and the bodies of zipper material 3H and 3L heat sealed with each other. As a result, the heat seal bars 1H and 1L and the receiver plate 5 are kept parallel to each other so that the webs of film material 2H and 2L and the bodies of zipper material 3H and 3L are sandwiched between the heat seal bars 1H and 1L and the receiver plate 5 in an appropriate manner. The apparatus can therefore make the webs of film material 2H and 2L and the bodies of zipper material 3H and 3L heat sealed with each other adequately. In addition, the upper and lower heat seal bars 1H and 1L are pressed against the webs of film material 2H and 2L, the bodies of zipper material 3H and 3L and the receiver plate 3 all over the surfaces of the upper and lower heat seal bars 1H and 1L, resulting in no uneven contact between the heat seal bars 1H and 1L and the receiver plate 3. The receiver plate 3 is not damaged with the heat seal bars 1H and 1L.

Furthermore, the receiver plate 5 and the support plate 7 are raised by the extension spring 11 so that the receiver plate 5 is moved away from the lower heat seal bar 1L after the webs of film material 2H and 2L and the bodies of zipper material 3H and 3L are heat sealed with each other, as described previously. The webs of film material 2H and 2L and the bodies of zipper material 3H and 3L are therefore lifted by the receiver plate 5 which is raised so that the lower web of film material 2L is torn off the lower heat seal bar 1L. The webs of film material 2H and 2L and the bodies of zipper material 3H and 3L are then fed again and intermittently. The webs of film material 2H and 2L are therefore fed intermittently in a torn off state, without advancing obliquely or tortuously. Moreover, the webs of film material 2H and 2L are fed intermittently and smoothly due to reduction in resistance. The heat sealed portion has no wrinkle not to be disfigured.

In addition, in the apparatus, the support plate 7 merely has to protrude on the one side of the webs of film material 2H and 2L, the extension spring 11 and the leaf springs 9 being disposed between the support plate 7 and the frame 8 on the one side of the webs of film material 2H and 2L, to construct the cantilever structure for the support plate 7. Unlike the apparatus of Japanese Patent Publication No. 3,618,939, it is not required to construct a double-support structure for the support plate. No drive is also required to make the support plate 7 raised. The drive is merely required to make the upper heat seal bar 1H lowered toward the lower heat seal bar 1L. Unlike the apparatus of each of Japanese Laid-Open Patent Publication No. H08-118,521, Japanese Laid-Open Patent Publication No. H10-31,535 and Japanese Utility Model Publication No. S43-19,033, it is not required to make the upper and lower heat seal bars lowered and raised respectively, to be simple in structure and low in cost.

The apparatus merely has to construct the cantilever structure for the support plate 7. The receiver plate 5 can therefore be interposed between the upper and lower bodies of zipper material and fixed to the support plate 7 in the apparatus of Japanese Patent Publication No. 4,526,592.

Figure 4:
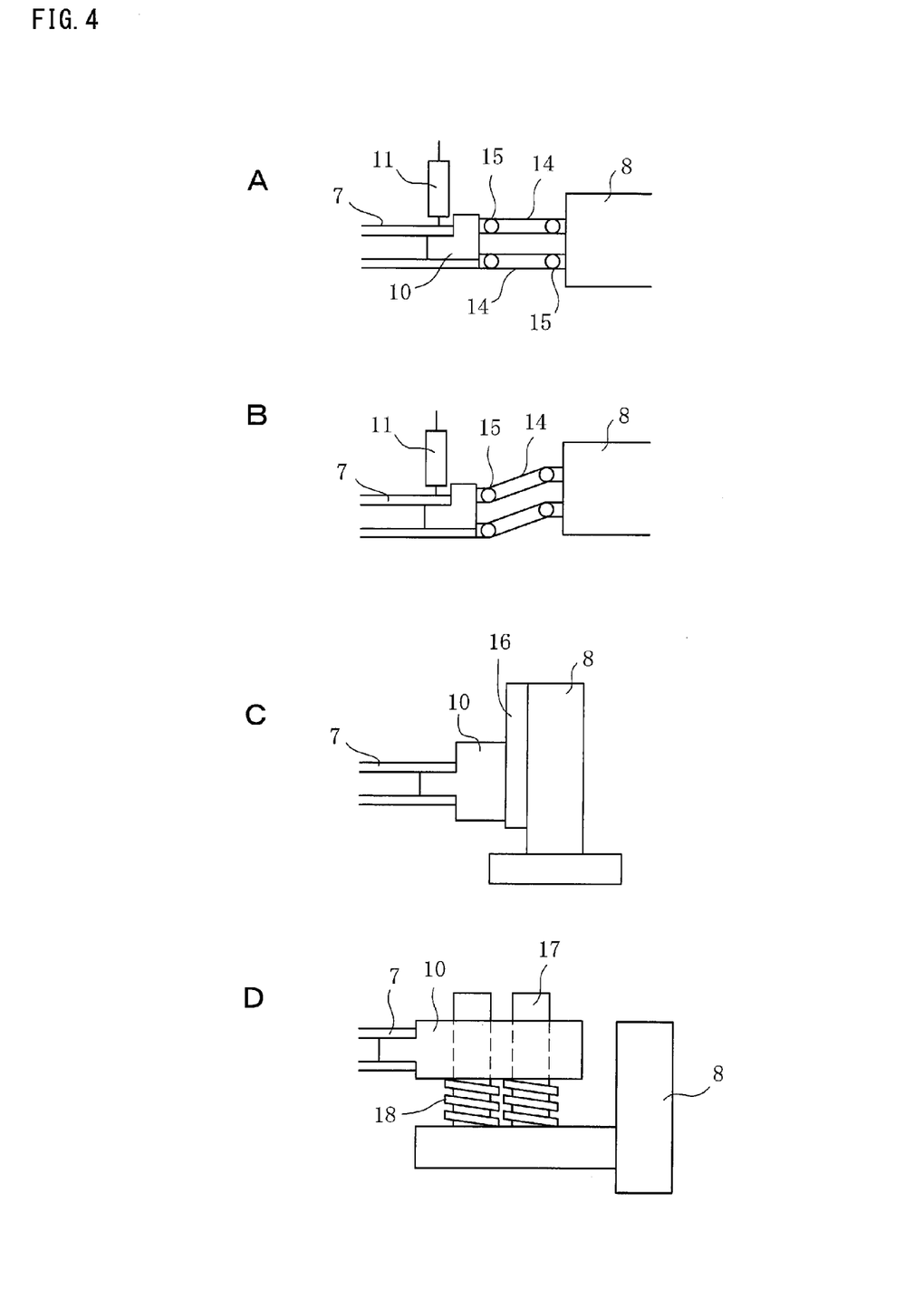
FIG. 4 is an explanatory view (A) of another embodiment, an explanatory view (B) of the links of (A) when acting on the support plate, an explanatory view (C) of another embodiment and an explanatory view (D) of another embodiment.

The attitude hold device may comprise upper and lower links 14, pins 15 being disposed between the support plate 7 and the links 14, so that the support plate 7 and the frame 9 are connected by means of the upper and lower links 14 as shown in FIG. 4 (FIGS. 4A, B). The upper and lower links 14 have the same length, and extend widthwise of the webs of film material 2H and 2L to be spaced from and disposed parallel to each other. The upper and lower links 14 therefore act on the support plate 7 so that the receiver plate 5 and the support plate 7 are held in attitude not to be inclined when being lowered and raised.

The attitude hold device may comprise a linear guide 16 acting on the support plate 7 so that the receiver plate 5 and the support plate 7 are held in attitude not to be inclined when being lowered and raised (FIG. 4C). The attitude hold device may comprise guide rods 17 acting on the support plate 7 so that the receiver plate 5 and the support plate 7 are held in attitude not to be inclined (FIG. 4D). The elastic support device may comprise compression springs 18 disposed about the guide rods 17 and between the support plate 7 and the frame 8.

The elastic support device may be a type of air cushion. For example, the elastic support device may comprise an air cylinder.

What is claimed is:

1. An apparatus for successively making plastic bags, the apparatus including upper and lower heat seal bars between which upper and lower webs of film material are directed, upper and lower bodies of zipper material being directed between the upper and lower webs of film material, the webs of film material and the bodies of zipper material being fed longitudinally thereof and intermittently, a receiver plate being interposed between the upper and lower bodies of zipper material, the upper heat seal bar being lowered toward the lower heat seal bar whenever the webs of film material and the bodies of zipper material are fed intermittently so that the webs of film material and the bodies of zipper material are sandwiched between the heat seal bars and the receiver plate, the upper web of film material and the upper body of zipper material being heat sealed with each other while the lower web of film material and the lower body of zipper material are heat sealed with each other, to successively make the plastic bags of the webs of film material and the bodies of zipper material, the apparatus comprising:

a support plate extending widthwise of the webs of film material to protrude on one of opposite sides of the webs of film material, the receiver plate being fixed to the support plate;

an elastic support device disposed on the one side of the webs of film material and interposed between the support plate and a frame to elastically support the receiver plate and the support plate so that the receiver plate and the support plate are pushed down and lowered by the upper heat seal bar to make the webs of film material and the bodies of zipper material sandwiched between the heat seal bars and the receiver plate and heat sealed with each other, the receiver plate and the support plate being raised by the elastic support device so that the receiver plate is moved away from the lower heat seal bar after the webs of film material and the bodies of zipper material are heat sealed with each other; and an attitude hold device disposed on the one side of the webs of film material and interposed between the support plate and the frame to act on the support plate so that the receiver plate and the support plate are held in attitude not to be inclined when being lowered and raised.

2. The apparatus as set forth in claim 1 wherein the attitude hold device comprises upper and lower leaf springs or links having the same length and extending widthwise of the webs of film material to be spaced from and disposed parallel to each other, the support plate and the frame being connected by means of the upper and lower leaf springs or links.

3. The apparatus as set forth in claim 1 wherein the elastic support device comprises an extension spring by which the receiver plate and the support plate are hung for elastic support.

4. The apparatus as set forth in claim 1 wherein the elastic support device comprises a compression spring or air cylinder.

5. The apparatus as set forth in claim 1 wherein the receiver plate extends longitudinally of the webs of film to have opposite ends, the receiver plate being fixed to the support plate at a position of at lease one of the opposite ends of the receiver plate.

6. The apparatus as set forth in claim 1 wherein the receiver plate extends longitudinally of the webs of film to have opposite ends each of which is provided with the support plate, the elastic support device and the attitude hold device, the receiver plate and the support plate being carried at each of the positions of the opposite ends of the receiver plate.

* * * * *